（12）United States Patent
Sarkissian

(10) Patent No.: US 9,251,531 B2
(45) Date of Patent: Feb. 2, 2016

(54) FILE FORMAT AND PLATFORM FOR STORAGE AND VERIFICATION OF CREDENTIALS

(71) Applicant: Cortex MCP, Inc., Ladera Ranch, CA (US)

(72) Inventor: Shaunt M. Sarkissian, Ladera Ranch, CA (US)

( * ) Notice: Subject to any disclaimer, the term of this patent is extended or adjusted under 35 U.S.C. 154(b) by 122 days.

(21) Appl. No.: 13/794,878

(22) Filed: Mar. 12, 2013

(65) Prior Publication Data

US 2014/0181927 A1 Jun. 26, 2014

Related U.S. Application Data

(60) Provisional application No. 61/740,731, filed on Dec. 21, 2012.

(51) Int. Cl.
*H04L 29/06* (2006.01)
*G06Q 30/02* (2012.01)

(52) U.S. Cl.
CPC ............ *G06Q 30/0251* (2013.01); *H04L 63/08* (2013.01); *H04L 2463/102* (2013.01)

(58) Field of Classification Search
None
See application file for complete search history.

(56) References Cited

U.S. PATENT DOCUMENTS

| 7,290,146 | B2 * | 10/2007 | Ekers et al. | 713/182 |
| 8,132,237 | B2 * | 3/2012 | Kang | 726/4 |
| 2007/0208665 | A1 * | 9/2007 | Ohara | 705/51 |
| 2009/0070268 | A1 | 3/2009 | Sarkissian et al. | |
| 2010/0250389 | A1 * | 9/2010 | Augustin et al. | 705/26 |

OTHER PUBLICATIONS

U.S. Appl. No. 13/834,763, filed Mar. 15, 2013.
U.S. Appl. No. 14/031,757, filed Sep. 19, 2013.

* cited by examiner

*Primary Examiner* — Jeffrey Pwu
*Assistant Examiner* — Wasika Nipa
(74) *Attorney, Agent, or Firm* — K&L Gates LLP

(57) ABSTRACT

In various embodiments, a computer-implemented method for generating and verifying officially verifiable electronic representations may be disclosed. The method may comprise receiving, by a credential database, a request for a credential action. The credential database may be configured to store one or more credentials comprising a status indicator. The method may further comprise determining, by the credential database, a response to the credential action based on the one or more user credentials stored in the credential database and transmitting, by the credential database, the response to a client device.

33 Claims, 12 Drawing Sheets

FILE FORMAT AND PLATFORM FOR STORAGE AND VERIFICATION OF CREDENTIALS

CROSS-REFERENCE TO RELATED APPLICATION

This application claims the benefit, under 35 U.S.C. §119 (e), of U.S. provisional patent application No. 61/740,731, filed Dec. 21, 2012, entitled "FILE FORMAT AND PLATFORM FOR STORAGE AND VERIFICATION OF CREDENTIALS", which is hereby incorporated by reference in its entirety.

TECHNICAL FIELD

The present disclosure relates to electronic transactions, and more particularly to systems, methods, and apparatuses for securely storing and displaying user credentials.

BACKGROUND

The rapid growth and evolution of traditional and electronic commerce markets has resulted in a wide-spread demand for monetary payments by digital transactions. However, currently payment systems are highly fragmented and insecure, which creates a threat of data compromise and theft during the transfer and use of electronic commerce data. This threat may result in losses for corporations as well as users of such systems, and these losses factor into escalating fees and client costs.

Additionally, as more users move to a digital transaction model, the need for digital identification also increases. As fewer users carry wallets or traditional payment forms, traditional forms of ID will become less common. Current platforms are insecure and carrying digital credentials increases the risk of identity theft or fraud in transactions. What is needed is secure system for storing and displaying user credentials.

SUMMARY

In various embodiments, a computer-implemented method for generating and verifying officially verifiable electronic representations may be disclosed. The method may comprise receiving, by a credential database, a request for a credential action. The credential database may be configured to store one or more credentials comprising a status indicator. The method may further comprise determining, by the credential database, a response to the credential action based on the one or more user credentials stored in the credential database and transmitting, by the credential database, the response to a client device.

In various embodiments, a computer-implemented method for requesting an officially verifiable electronic representation is disclosed. The method may comprise generating, by a processor, a request for a credential action. The request may comprise a credential identifier. The processor may transmit the request for the credential action to a credential database and receive a response to the request for the credential action.

In various embodiments, an apparatus for generating and verifying officially verifiable electronic representations is disclosed. The apparatus may comprise a processor and a memory unit operatively coupled to the processor. The memory unit may be configured to store a plurality of instructions, wherein the instructions are configured to program the processor. The processor may be programmed to maintain a credential database. The credential database may be configured to store one or more credentials comprising a status indicator. The processor may further receive a request for a credential action and determine a response to the credential action based on the one or more user credentials stored in the credential database. The processor may be programmed to transmit the response to a client device. In various embodiments, a credential database may store the one or more credentials in an encrypted format which can only be decrypted by the apparatus. In various embodiments, the credential database may access additional information via a network to complete a verification of a credential. In various embodiments, the credential database may use additional information provided by a client, such as, for example, passwords, biometric information, client GPS location information, and/or a unique device identifiers, to complete the verification.

BRIEF DESCRIPTION OF THE FIGURES

The features of the various embodiments are set forth with particularity in the appended claims. The various embodiments, however, both as to organization and methods of operation, together with advantages thereof, may best be understood by reference to the following description, taken in conjunction with the accompanying drawings as follows:

DESCRIPTION

Figure 1:
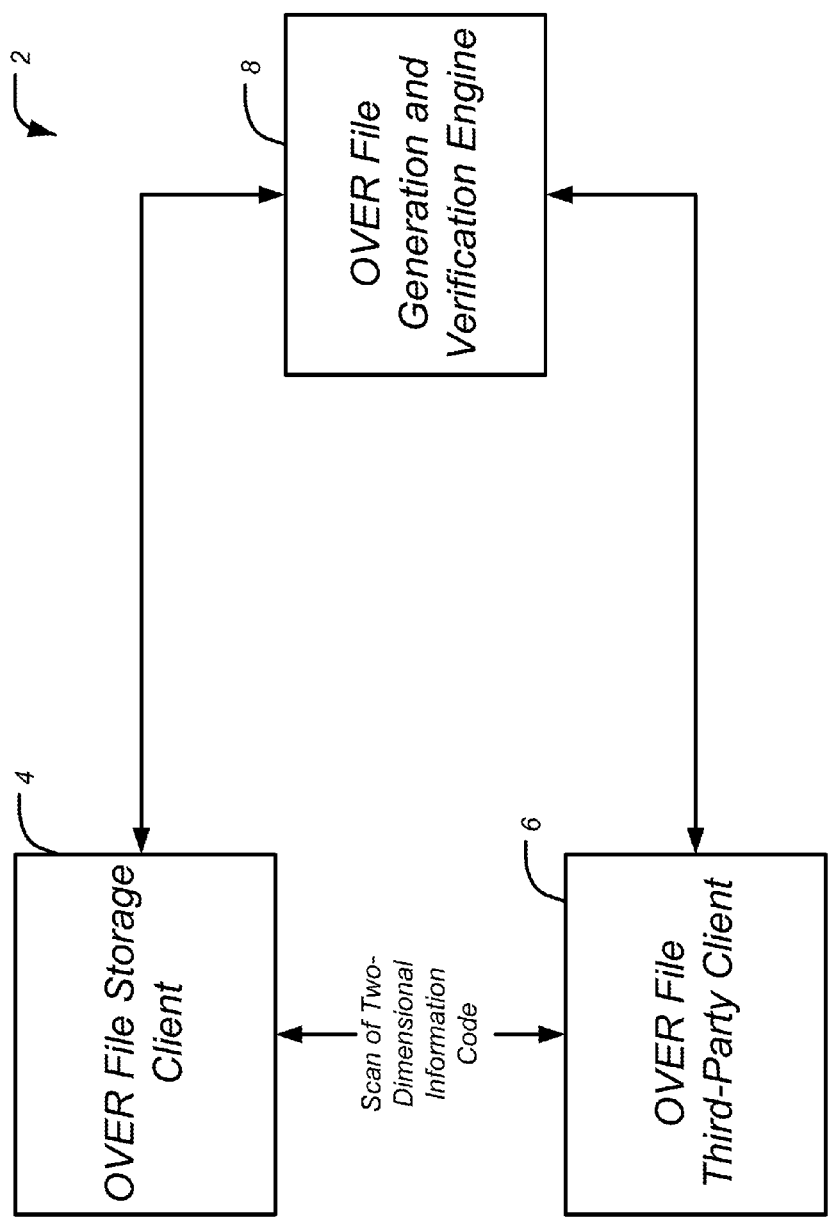
FIG. 1 illustrates one embodiment of a virtual credential management platform.

In various embodiments, a computer-implemented method for generating and verifying officially verifiable electronic representations may be disclosed. The method may comprise receiving, by a credential database, a request for a credential action. The credential database may be configured to store one or more credentials comprising a status indicator. The credential database may further be configured to store one or more methods for accessing one or more status indicators on a network, such as, for example, via web-service or access to a second data store. The method may further comprise determining, by the credential database, a response to the credential action based on the one or more user credentials stored in the credential database and transmitting, by the credential database, the response to a client device. The method may further incorporate additional information submitted by a client, such as, for example, passwords, device identifiers, client GPS location, and/or biometric data, in conjunction with the stored credential, to determine a response to the request for a credential action.

In various embodiments, a computer-implemented method for requesting an officially verifiable electronic representation is disclosed. The method may comprise generating, by a processor, a request for a credential action. The request may comprise a credential identifier. The request may further comprise additional information to verify the credential. The processor may transmit the request for the credential action to a credential database and receive, a response to the request for the credential action. In various embodiments, the processor may incorporate additional information submitted by a client, such as, for example, passwords, device identifiers, GPS location information, and/or biometric information, to determine a response. In various embodiments, the processor may access other data stores available via a network to determine a response.

In various embodiments, an apparatus for generating and verifying officially verifiable electronic representations is disclosed. The apparatus may comprise a processor and a memory unit operatively coupled to the processor. The memory unit may be configured to store a plurality of instructions, wherein the instructions are configured to program the processor. The processor may be programmed to maintain a credential database. The credential database may be configured to store one or more credentials comprising a status indicator. The processor may access other data stores via a network. The processor may access remote functionality via a network. The processor may further receive a request for a credential action and determine a response to the credential action based on the one or more user credentials stored in the credential database. The processor may be programmed to transmit the response to a client device.

Reference will now be made in detail to several embodiments, including embodiments showing example implementations of systems and methods for generating, storing, and displaying OVER File credentials. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

In some embodiments, an Officially Verifiable Electronic Representation (OVER) File may provide a secure file format and platform for the storage and verification of key user or consumer credentials. As shown in FIG. 1, in one embodiment, an OVER File management platform 2 may comprise three main components, an OVER File storage client 4, an OVER File third party client 6, and an OVER File generation and authorization engine 8. The OVER File storage client 4 may be executed by a user device to store generated OVER Files representative of the user's credentials. The OVER File storage client 4 may be included as part of a virtual wallet platform or may comprise a stand-alone user application. The OVER File storage client 4 may initiate generation of new OVER Files and may comprise a display function for displaying stored user credentials for third-party verification. The OVER File credentials may comprise any officially verifiable electronic credential, such as, for example, a government issued identification such as a driver's license, non-driver's identification card, or professional license. The OVER File credentials may also comprise privately issued credentials, such as, for example, employee identification cards, merchant loyalty cards, access cards, insurance credentials, transportation credentials, or any other credential that may be electronically verified by an issuing agency.

In some embodiments, an OVER File third party client 6 may be executed by a third party device to verify the existence and validity of OVER File credentials presented by a user. The OVER File third party client 6 may allow a third party to scan or otherwise interact with OVER File credentials displayed on a user device. The OVER File third party client 6 may contact a remote server, such as the OVER File generation and verification engine 8, for verification of the displayed user credential, as explained in more detail below. The OVER File third party client 6 may further allow a third party to request generation of an OVER File credential for delivery to an OVER File storage client 4. In some embodiments, the OVER File third party client 6 may comprise a stand alone application executed by the third party device. In other embodiments, the OVER File third party client 6 may comprise an application program interface (API) configured to provide OVER File credential verification through a third party application.

In some embodiments, an OVER File generation and authorization engine 8 may generate OVER File credentials in response to requests from an OVER File storage client 4 or an OVER File third party client 6. The OVER File credentials may be generated from data provided by a user, a third party, or an issuing agency or authority. The OVER File generation and authorization engine 8 may further provide authorization of OVER File credentials requested by third parties. The OVER File generation and authorization engine 8 may operate on a remote server. Client devices, such as the user device or the third party device, may communicate with the OVER File generation and authorization engine 8 using any suitable network or communication system. In some embodiments, the OVER File generation and verification engine 8 may generate and maintain a status indicator for each stored OVER File credential configured to indicate whether the OVER File credential is currently valid.

Figure 2:
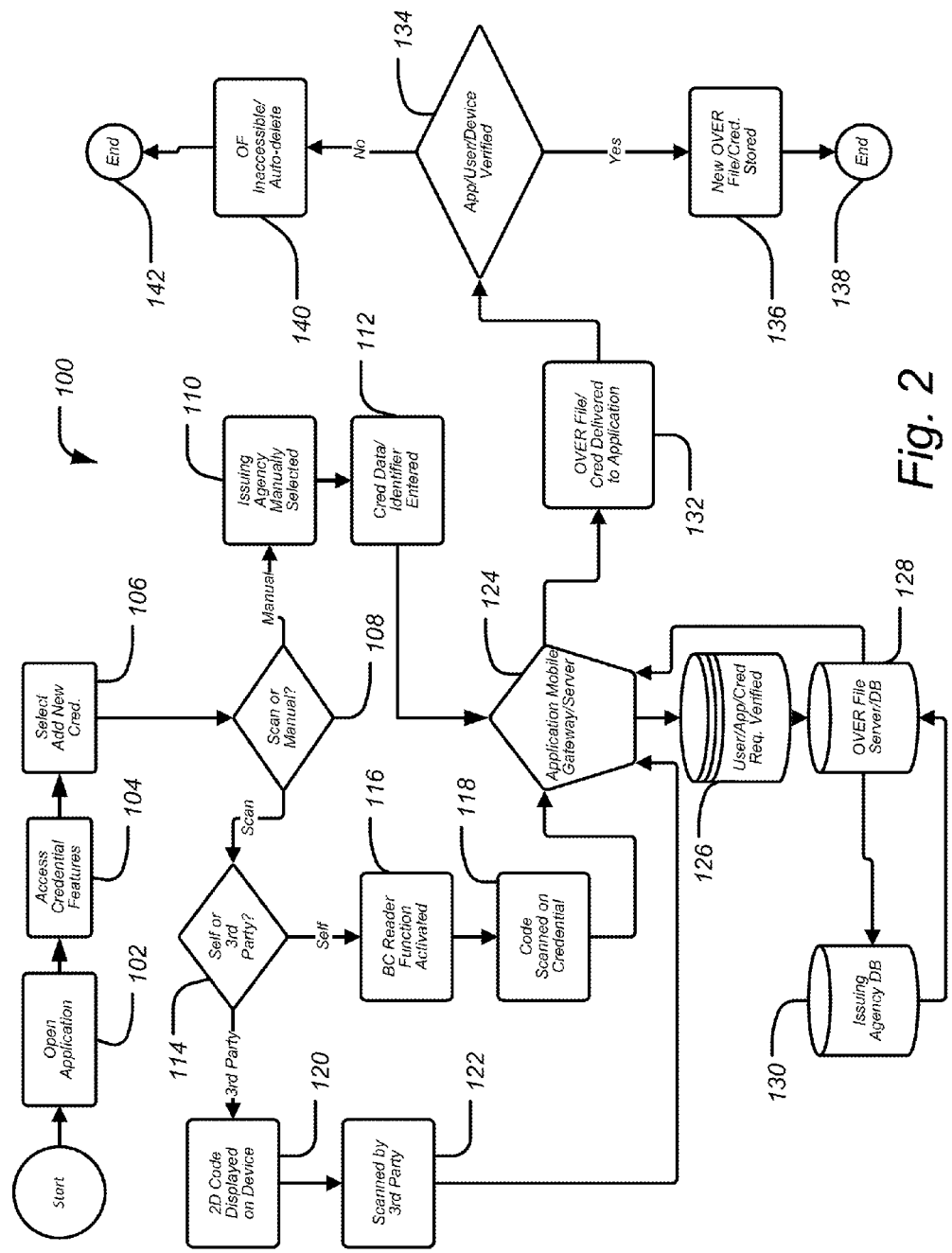
FIG. 2 illustrates one embodiment of an Officially Verifiable Electronic Representation (OVER) File generation process.

FIG. 2 illustrates one embodiment of a process 100 for generating and storing an Officially Verifiable Electronic Representation (OVER) File credential. OVER File generation may be performed by the OVER File generation and verification engine 8. An engine may comprise computer program that drives the functionality of a system or process, such as, for example, the process 100 for generating and storing an OVER File credential. A user may open 102 an application for generating and/or displaying OVER Files, such as the OVER File storage client 4. In some embodiments, the application may be a stand-alone application. In other embodiments, the OVER File storage client 4 may be included in an integrated application.

A user may access 104 the OVER File credential features of an OVER File storage client to add 106 a new credential to the OVER File storage client 4. The user may be presented with a credential generation screen, such as the credential generation screen 518 shown in FIG. 7. A credential may be added manually by a user or automatically by the application. In some embodiments, a user may select 108 the method of entering the credential, for example, manual or automated entry, using the credential generation screen. In some embodiments, a user may select 110 manual entry of the credential. The user may interact with the credential generation screen to enter 112 information about the credential, such as, for example, the issuing agency, a credential identifier such as a credential identification number, or any other information associated with the credential. For example, in one embodiment, a user may choose to manually enter a credential representing a rewards card for a retailer. The user may be prompted to identify the retailer, a rewards card identification number, and a name associated with the rewards card.

In some embodiments, information for generating an OVER File credential may be automatically added to the OVER File storage client 4. For example, information necessary for the generation of an OVER File credential may be entered by scanning an information code. The information code may be represented, for example, by a quick-response (QR) Code, standard one dimensional bar code, alpha numeric bar code (for example, Type-128), and/or other suitable information codes. The information code may be represented data sent by a radio transmission or by an electronic transmission broadcast over a network. In some embodiments, a user device may scan an information code provided by an issuing agency. The information code may comprise information, such as a credential identifier, necessary for generating an OVER File and contacting an issuing agency database 130 for verification of the credential. The information code may be provided by the issuing agency during creation of the credential and may be scanned by a user using a scan function of the user device.

In some embodiments, the information code may comprise information necessary for the generation of a credential by a third party. A user may select 114 a third-party scan option for generation and delivery of a new credential. The OVER File storage client 4 may generate a information code on the user device for scanning by the third party. The information code may comprise any necessary information for generation and delivery of the OVER File credential to the user device, such as, for example, the user's name, contact information, social security number, biometric information, location information, user-selected password, and/or a device identifier to identify the user device. The information code may be displayed 120 on the user device and may be scanned 122 by a third-party using a third-party device. The third party device may execute an application, such as the OVER File third party client 6, for scanning the information code and contacting an OVER File generation and verification engine 8. The OVER File generation and verification engine 8 may be executed by any suitable system. The OVER File generation and verification engine 8 may comprise a credential data store, such as, for example, a database, a web service, a flat file configured to store data, and/or any other suitable datastore. The credential datastore may comprise a memory unit formed integrally with the system configured to execute the OVER File generation and verification engine 8 or may comprise a remote storage device, such as, for example, a database connected to the OVER File generation and verification engine 8 through a local area network (LAN), wide area network (WAN), or Internet connection. Although the various embodiments of the OVER File generation and verification engine 8 are discussed with respect to an OVER File database, those skilled in the art will recognize that any suitable architecture and/or datastore may be employed by the OVER File generation and verification engine.

In some embodiments, an issuing agency may set one or more business rules that a user may be required to meet prior to verification of the OVER File credential by the issuing agency, such as being required to verify the user's identity prior to generation of the OVER File credential. For example, a user attempting to add a driver's license credential may be required to visit a state DMV office. After verifying the identity of the user, the DMV office may provide the user with a scannable information code for generation of an OVER File credential for the user's driver's license. The information code may comprise a credential identifier and an authorization code to enable the OVER File database 128 to generate the OVER File credential. In some embodiments, a physical credential issued by the issuing agency may contain an information code that may be scanned by the user at any time to add the credential to the OVER File storage client 4. For example, a retailer loyalty card may comprise a scannable quick-response (QR) code that a user may scan to add an OVER File credential of the loyalty card to a user device.

After the necessary information has been entered to generate an OVER File credential, either manually or through an automated process such as scanning, the generating device may contact an application gateway 124 to deliver an OVER File generation request to an OVER File database 128. The OVER File database 128 may comprise an OVER File generation and verification engine 8. The application gateway may request 126 generation of an OVER File and verification of the generated OVER File credential. The OVER File database 128 may be configured to create a new OVER File containing the entered credential information. The OVER File database 128 may contact an issuing agency datastore, such as, for example, an issuing agency database 130, to verify the information contained in the OVER File generation request and to obtain additional credential information stored by the issuing agency database 130. Issuing agencies may comprise, for example, government entities such as States or licensing agencies, corporations issuing credentials to employees, retailers issuing loyalty or other customer identifiers, or any other suitable agency for issuing credentials. Although the various embodiments are generally described as communicating with an issuing agency database, those skilled in the art will recognize that issuing agencies may utilize any suitable datastore to store one or more credentials generated by the issuing agency.

The additional credential information may comprise any information stored by the issuing agency database but not provided in or contradictory to the OVER File generation request. For example, in one embodiment, a user may generate a credential representative of a driver's license. The user device may provide a driver's license identification number and an issuing state to the OVER File database 128 for generation of the OVER File. The OVER File database 128 may contact the issuing agency database 130, such as a state DMV database, and provide the driver's license identification number to the issuing agency database 130. The issuing agency database may respond by indicating the validity of the requested credential containing the driver's license identification number and may provide the legal name, address, and birth date of the person associated with the driver's license identification number. The issuing agency database may also provide an image of the requested credential for display on the user device. Once the information has been verified, the OVER File database 128 may generate a new OVER File containing the entered credential information. In some embodiments, the OVER file may be generated by the issuing agency database 130 and sent to the OVER File database 128 for storage and distribution to the user device. The issuing agency may also provide a status indicator for the generated OVER File credential.

In some embodiments, the OVER File may be delivered to a device identified in the OVER File generation request for storage. For example, generated OVER File credential may be delivered to the device requesting generation of the OVER File generation, such as a user device. As another example, if a user provides a information code to a third party for scanning and generation of a credential, the information code may contain a device identifier identifying the user device as the destination for the generated OVER File credential. Copies of the OVER File credential may be stored on both a user device and in the OVER File database 128. The delivered OVER File credential may be tied to a specific user device. For example, the OVER File credential may contain a device identifier identifying the user device or application and/or the OVER File may be encrypted in a format which requires the device identifier and/or a user-provided password to decrypt. The OVER File may include a hash value which requires the device identifier and/or a user-provided password to verify. The OVER File credential may only be usable by a device matching the device or application identifier. By tying the OVER File credential to a specific device, the security of the credential is increased, as an OVER File delivered to a device other than the user device, for example through network snooping, may be prevented from working on a device other than the user device. The delivered OVER File credential may execute 134 a device check to verify the current device matches the specific device identifier. If the current device and the device identifier are the same, the OVER File credential may be stored 136 on the user device. If the specific device identifier and the current device are not the same, the OVER File credential may be inaccessible or destroyed. In some embodiments, the OVER File may require user-specific information, such as, for example, biometric information, location information, and/or passwords, to decrypt the file or to verify the OVER File credential.

Figure 3:
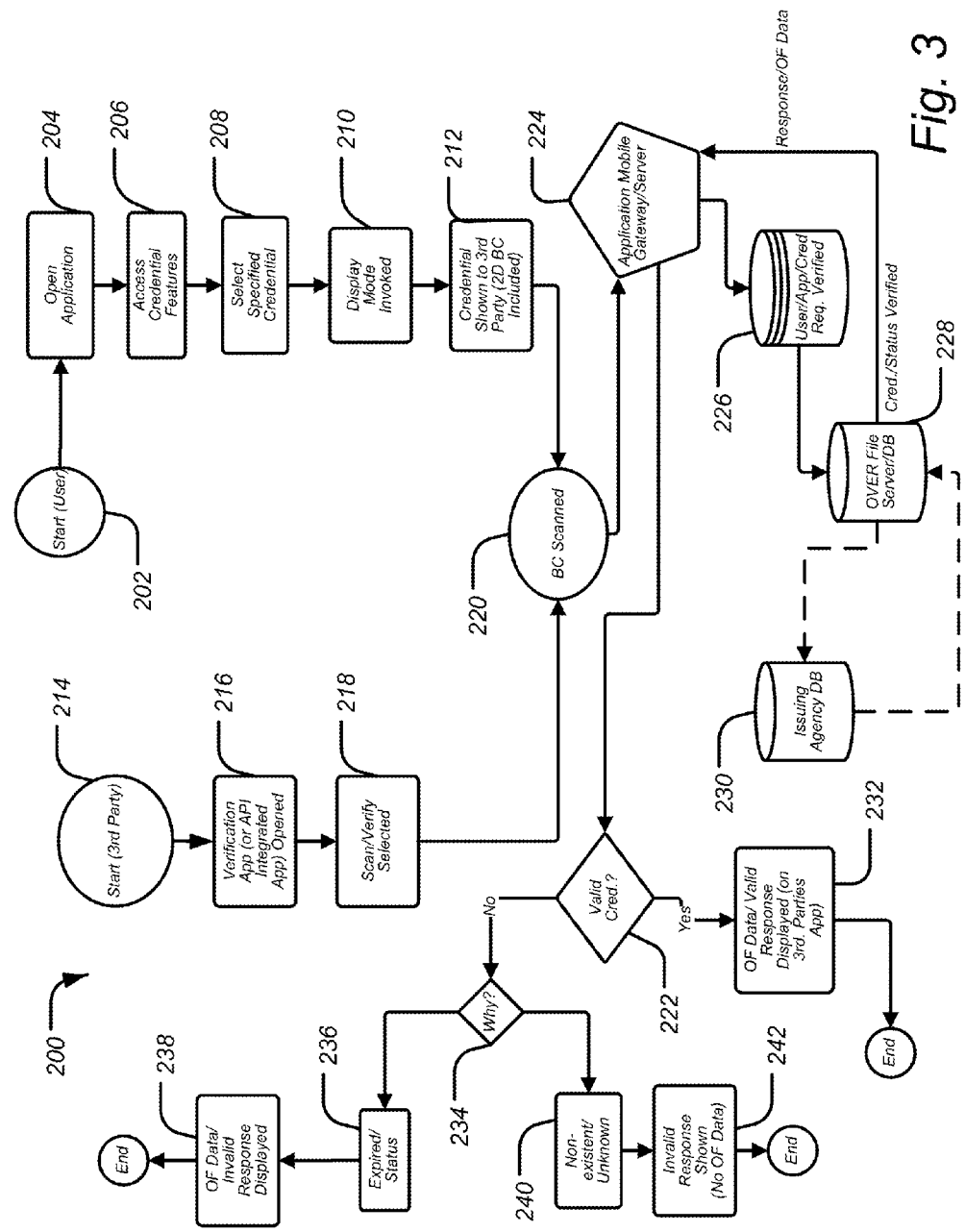
FIG. 3 illustrates one embodiment of an OVER File verification process.

FIG. 3 illustrates one embodiment of an OVER File verification process 200. A user may begin 202 the verification process by opening 204 an OVER File storage client, accessing 206 the credential features of the OVER File storage client, and selecting 208 a stored OVER File credential for display 210 on the user device. The user may select the OVER File credential from a list of credentials stored on the user device, such as, for example, the credential category screen 514 shown in FIG. 6. Credential information stored in the OVER File may be displayed on the user device. In some embodiments, the displayed information may comprise some or all of the information stored in the OVER File credential. For example, a stored OVER File credential may be displayed as shown in FIGS. 18 and 19, and may comprise one or more text fields, an image field, a title field, and a information code field. The user may present 212 the displayed credential to a third party for verification. The displayed information code may comprise a credential identifier, such as, for example, a credential identification number.

The third-party may initiate a third party verification process by opening 216 a verification application, such as the OVER File third party client 8, for verifying credentials displayed on a user device. In some embodiments, the verification application may be a stand-alone application specifically configured for verification of OVER File credentials. In other embodiments, the verification application may comprise an application capable of verification of OVER Files through an application programming interface (API). The third party may use the verification application to select a scanning option 218 to scan 220 the information code displayed on the user device. After scanning the information code, the third-party verification application may contact an application gateway 224 to provide verification of the scanned OVER File credential. The third-party verification application may transmit the information contained in the information code displayed on the user device, such as the credential identifier. For example, an information code may comprise an issuing agency identifier and a credential identifier for the displayed credential.

The application gateway 224 may communicate with a verification server 226 and an OVER File database 228. The verification server 226 may comprise the OVER File generation and verification engine 8. Although the application gateway 224, the verification server 226 and the OVER File database 228 are shown as separate systems in FIG. 2, those skilled in the art will recognize that the application gateway 224, the verification server 226 and the OVER File database 228 may be combined into a single system. The OVER File database 228 may store copies of all generated OVER File credentials. The OVER File credentials may be stored in any suitable manner, such as, for example, on a memory unit or other suitable storage device. In some embodiments, the OVER File credentials may be stored on a remote device, such as a networked database, and may be accessed by a reference stored in an OVER File datastore, such as, for example, the OVERE File database. In various embodiments, the reference may comprise a hash code, a pointer, network address, and/or any other suitable reference to a remotely stored file. The OVER File database 228 may compare information received from the third-party verification application, such as, for example, a credential identifier, with the OVER File credentials stored in the OVER File database 228. A status indicator providing the validity of the OVER File credential may be sent to the OVER File third party client. If the OVER File database determines 230 that the credentials are valid, the verification server 226 may provide a valid status indicator to the third party device. The verification server 226 may further provide a portion of the stored OVER File credential, such as a credential image, to the third party device. In some embodiments, the status indicator and a portion of the stored OVER File credential may be displayed on the third-party device. If the OVER File verification server 226 determines 230 that the credentials are invalid, the OVER File verification server 226 may transmit a status indicator indicating an invalid credential and may provide the reason for the invalid status indicator to the third party device.

The OVER File database 228 may be in communication with one or more issuing agency databases 230. The issuing agency database 230 may be maintained by an issuing agency authorized to issue one or more credentials. For example, a state Department of Motor Vehicles may maintain a database comprising all driver's licenses issued by the state. The OVER File database 228 may receive periodic updates from the issuing agency database 230 for the OVER File credentials stored in the OVER File database 228. The update period may depend on the type of credential, requirements of the issuing agency, frequency of verification requests, or other factors affecting the security requirements for a specific credential type. For example, the OVER File database 228 may receive updates on a daily basis for high-security credentials, such as, for example, driver's licenses. The OVER File database 228 may receive updates on a weekly basis for credentials requiring a lower security level, such as merchant loyalty cards. In some embodiments, the OVER File database 228 may contact the issuing agency database 230 to begin the update process. In some embodiments, the issuing agency database 230 may initiate the update process. The OVER File database 228 may be updated for individual OVER File credentials or may receive a batch update from an issuing agency for all OVER File credentials issued by the issuing agency.

A status indicator may be sent to the third party device to indicate the validity status of an OVER File credential matching the credential identifier associated with the OVER File credential displayed on the user device. The status indicator may comprise a valid indicator if the verification server 226 determines that a valid OVER File credential matching the credential identifier received from the third party verification application is stored in the OVER File database 228 and the OVER File database 228 indicates that the OVER File credential is currently valid. The verification server 226 may provide a response 232 to the third party device comprising the status indicator indicating a valid credential and may provide a portion of the credential information stored in the OVER File database 228. For example, in response to a verification request for an OVER File credential of a driver's license, the verification server 226 may provide a valid status indicator and may provide an image of the driver's license to the third party device. As another example, in response to the same request, the verification server 226 may provide a valid status indicator, an image of the credential holder provided by the issuing agency, and the birth date of the credential holder. Those skilled in the art will recognize that the response to the verification request may be customized based on each type of credential and by each issuing agency.

In some embodiments, the verification server 226 may determine 222 that a requested credential is invalid. For example, the credential verification request may be considered invalid if an OVER File credential matching the provided credential identifier was not located in the OVER File database 228. In another embodiment, an OVER File credential matching the provided credential identifier may be stored in the OVER File database 228 but may be expired. In another embodiment, an OVER File credential matching the provided credential identifier may be stored in the OVER File database but may not match a provided device identifier, provided biometric data, and/or a provided password. The verification server 226 may provide a status indicator indicating an invalid credential. The invalid status indicator may indicate why 234 the credential is considered invalid. For example, an invalid status indicator may indicate 236 an expired credential and may display 238 a response on the third-party device that the requested credential exists but has expired. As another example, the invalid status indicator may indicate 240 that the requested credential does not exist. An invalid status indicator may be displayed 242 on the third party device stating that there is no data available for the requested OVER File. As another example, additional information submitted by the client, such as, for example, a password, biometric information, and/or location information, may not match information stored with the credential.

Figure 4:
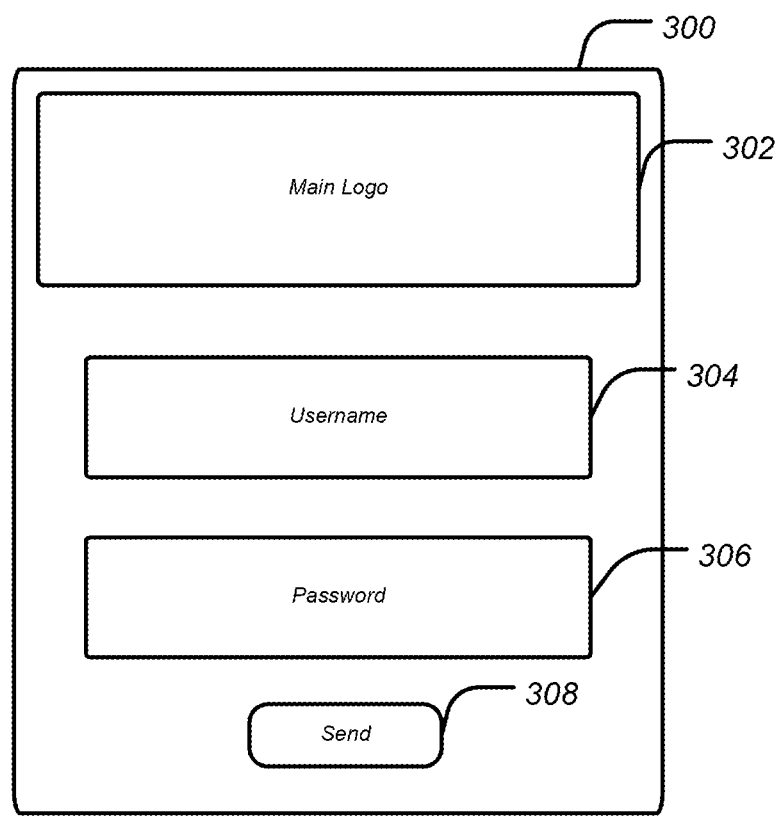
FIG. 4 illustrates one embodiment of a virtual wallet platform.

FIG. 4 illustrates one embodiment of a virtual wallet platform 300. The virtual wallet platform may provide an electronic platform for payment and credential storage. The virtual wallet platform 300 may provide electronic replacement for credit cards, cash, identification, or other cards traditionally carried in a wallet. In some embodiments, the virtual wallet platform may provide a Reducing Currency Denomination (RCD) payment platform and an OVER File credential storage client 4. FIG. 4 shows a logon screen for a virtual wallet platform 300. In some embodiments, the virtual wallet platform 300 may require a username 304 and a password 306 be provided prior to accessing the RCD payment platform or the OVER File credential platform. After entering a username 304 and password 306, a user may submit the username 304 and password 306 for verification using a send button 308. The username 304 and password 306 may be verified by a local processor and memory or may be sent to a remote server for verification. The logon screen may comprise a logo 302 of the virtual wallet platform 300. An RCD payment platform is described in more detail in U.S. patent application Ser. No. 11/851,215, entitled "SYSTEMS, METHODS, AND APPARATUSES FOR SECURE DIGITAL TRANSACTIONS," which is hereby incorporated by reference in its entirety.

Figure 5:
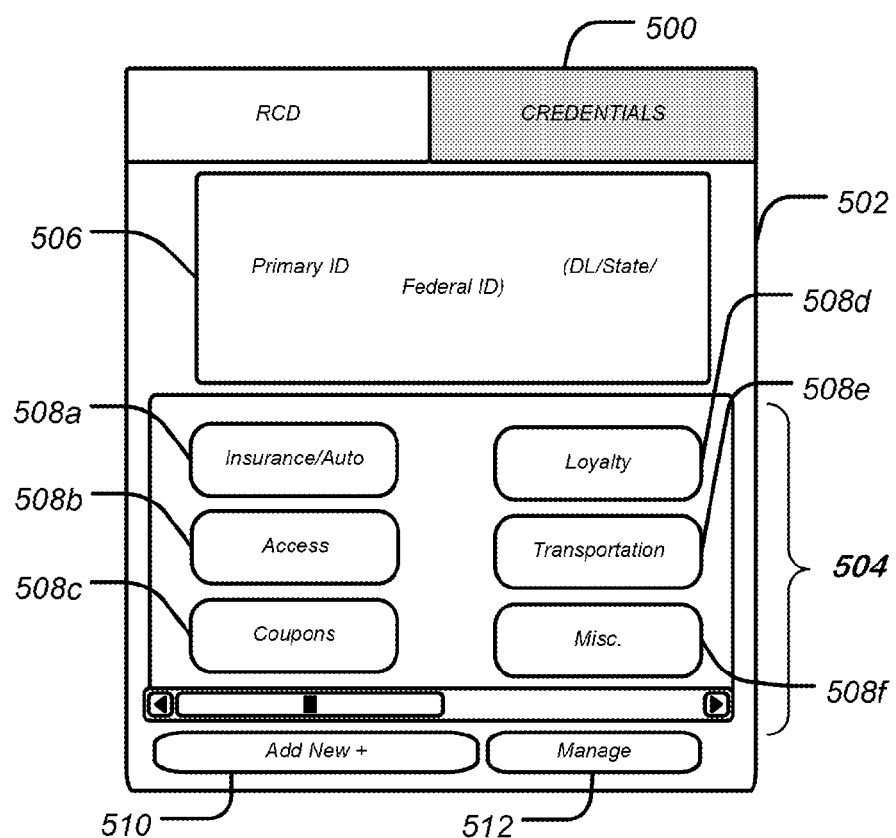
FIG. 5 illustrates one embodiment of an OVER File storage client component of the virtual wallet platform of FIG. 4.

FIG. 5 illustrates one embodiment of an Officially Verifiable Electronic Representation (OVER) File storage client 500. The OVER File storage client 500 may provide storage and retrieval of one or more OVER File credentials associated with a user device. FIG. 5 illustrates one embodiment of an OVER File storage client 500 home screen 502. The home screen 502 may provide access to one or more OVER File credentials stored by the OVER File storage client 500 as part of the virtual wallet platform 300. A primary ID 506 may be displayed on the home screen 502 to allow quick and convenient access to the primary ID 506. The primary ID 506 may be selectable by the user, and may comprise, for example, a government issued driver's license or an employer issued employee ID. In some embodiments, the primary ID 506 may be accessible from any screen of the OVER File storage client 500, for example, through a predetermined user gesture, such as swiping the top of the screen down.

The home screen 502 may further provide one or more credential buttons 508a-508f for accessing a specific category of credentials, such as, for example, insurance credentials 508a, access credentials 508b, electronic coupons 508c, loyalty card credentials 508d, transportation credentials 508e, or miscellaneous credentials 508f. The user credentials may displayed in a wallet card design 504. A user may select one of the credential buttons 508a-508f to access OVER File credentials stored on the user device and classified in the selected category. For example, a user may select the loyalty credentials button 508d and may be presented with a list of OVER File credentials stored on the user's device that have been categorized as loyalty credentials, such as, for example, retailer loyalty cards, frequent buyer cards, retailer discount cards, or any other type of loyalty credential. The home screen 502 may further comprise a new button 510 for adding one or more new credentials and a manage button 512 for accessing a screen for managing the OVER File credentials stored on the user device.

Figure 6:
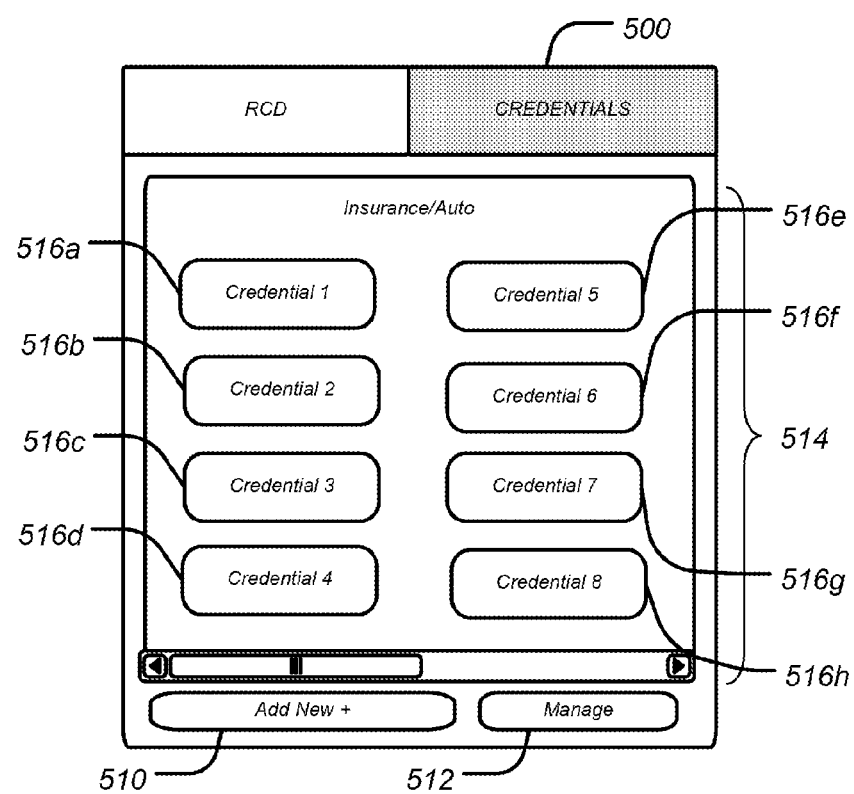
FIG. 6 illustrates one embodiment of a credential type display of the OVER File storage client.

FIG. 6 illustrates one embodiment of a credential category screen 514 configured to display stored OVER File credentials classified in the selected category. The credential category screen 514 may be accessed by selecting one of the credential buttons 508a-508f displayed on the home screen 502. The credential category screen 514 may display one or more available credentials that have been categorized in the selected category. For example, credential category screen 514 illustrates one embodiment of an insurance and automobile credential category displaying OVER File credentials 516a-516h classified as insurance or automobile credentials. For example, the OVER File credentials 516a-516h may comprise auto insurance credentials, home insurance credentials, or medical insurance credentials. Additionally, the OVER File credentials may comprise automobile credentials, such as, for example, a registration card, inspection documents, or an automobile club member card. The OVER File credentials 516a-516h may be associated with a single category, such as the insurance category, or may be associated with multiple categories.

Figure 7:
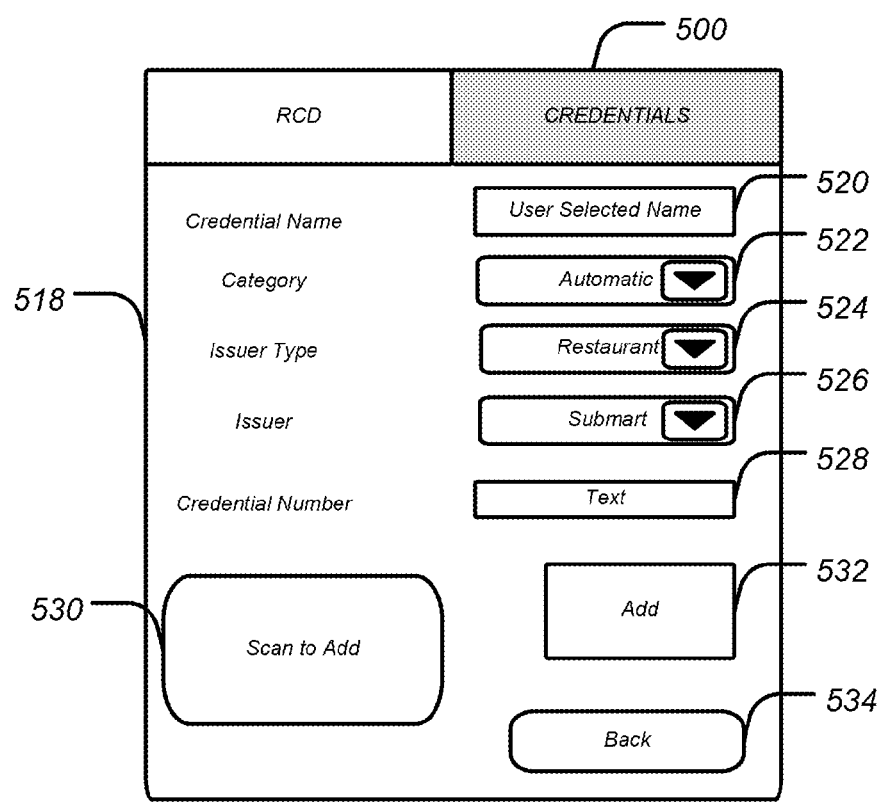
FIG. 7 illustrates one embodiment of a displayed OVER File credential oriented horizontally.

FIG. 7 illustrates one embodiment of a credential generation screen 518. The credential generation screen 518 may be accessed by selecting the new credential button 510 displayed on the home screen 502. The credential generation screen 518 may be configured to allow a user to request the generation of a new OVER File by an OVER File generation and verification engine 8. The credential generation screen 518 may allow a user to input information necessary for the generation of a new credential either manually or through an automated process. If a user wishes to enter the information manually, the user may enter the necessary credential information in credential fields 520-528. Necessary credential information may comprise a credential name 520, a credential category 522, an issuer type 524, an issuer 526, and a credential number 528. The credential category 522 and the issuer type 524 may be automatically set by the OVER File generation and verification engine 8 or may be manually set by the user. The credential number 528 may comprise a unique credential identifier generated by the issuing agency. The credential number 528 may be used by the OVER File generation and verification engine 8 to verify the validity of the requested credential and to obtain additional information associated with the generated OVER File credential not entered by the user. For example, a loyalty credential may have a certain number of loyalty points associated with the credential. The OVER File generation and verification engine 8 may use the credential number 528 to query the issuing agency regarding the current value of loyalty points associated with the credential. After entering the required credential information, a user may transmit the input information for the generation of a new OVER File credential to the OVER File generation and verification engine 8. The user may transmit the information using the add button 532.

In some embodiments, the credential generation screen 518 may allow a user to automatically enter a credential by scanning an information code, such as a barcode or quick response (QR) code. A user may access the scanning functionality by selecting the scan to add button 530. After selecting the scan to add button 530, the scanning function of a user device may be activated to allow the user to scan an information code provided by an issuing agency. The information code may comprise the information necessary for the OVER File server to contact an issuing agency database to verify the scanned credential and to obtain additional credential information. For example, in one embodiment, a user may wish to add a driver's license to the stored OVER File credentials on the user device. The user may be required to go to a state department of motor vehicle (DMV) location to verify the user's identity. After verifying the user's identity, the DMV may generate an information code for the user to scan containing the user's driver's license identification number and an authorization number.

Once the necessary information has been entered, either manually or automatically, the OVER File storage client 500 may contact the OVER File generation and verification engine 8 to generate the requested OVER File credential. The OVER File generation and verification engine 8 may contact the issuing agency database to verify the credential using the provided information as discussed above with respect to FIG. 2. The issuing agency database may provide additional information associated with the requested credential and not provided during the initial entry of the credential information. For example, a user request to add a driver's license may comprise a driver's license identification number. The issuing agency database may provide additional information such as the user's photo, address information, age information, or license class information. The use of an information code for adding a user credential provides convenience and security, as the user does not have to manually enter the credential information and an issuing agency can control the generation of OVER Files associated with the issuing agency's credentials.

In some embodiments, a user may present a stored OVER File credential to a third party for verification. For example, a user may wish to gain access to an age restricted location or purchase an age restricted product. A third party may require a user to present identification to verify the user's age prior to allowing the user access to the age restricted location or product. A user may choose to present a stored OVER File containing the user's age information, such as, for example, an OVER File credential representative of the user's driver's license. A third party may be required to verify the validity of the presented credential. The OVER File storage client 500 may generate a scannable information code for scanning by the third party to provide verification of the credential, as described in more detail above. In another embodiment, the OVER File storage client may generate an information code in the form of a networked or radio transmission, such as, for example, a Near Field Communication (NFC) or Bluetooth, or in the form of sensor information, such as, for example, a bump. A credential code screen 536 may be generated on the user device. The credential code screen 536 may comprise a scannable information code 538 representative of the selected OVER File credential. The third party may scan the information code 538 using an OVER File third party client 6. The OVER File third party client 6 may use the information contained in the information code 538 to contact an OVER File generation and verification engine 8 to verify the validity of the presented OVER File credential. In some embodiments, the information code 538 may be presented on the user device for a predetermined period of time at which point the user device may revert to a previously displayed screen, such as the credential category screen 514. In some embodiments, the user may be able to revert to the previous screen by pressing a back button 534.

Figure 9:
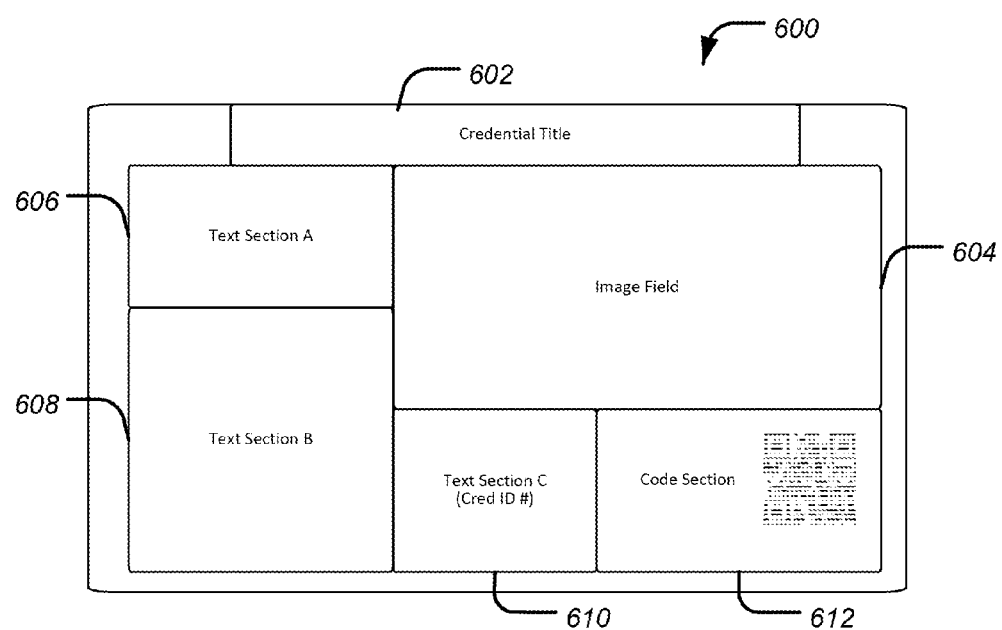
FIG. 9 illustrates one embodiment of an OVER File generation screen.

When presenting a credential to a third party for verification, the OVER File storage client 500 may display a scannable information code, as described above. In some embodiments, a portion of the stored OVER File may be displayed on the user device for presentation to the third party. FIG. 9 illustrates one embodiment of a credential display 600. The credential display 600 may be configured to display a selected OVER File credential on a user device. The credential display 600 may be standardized, such that each stored OVER File credential utilizes the same fields in a similar manner. In some embodiments, the credential display may be standardized based on the category in which the OVER File credential is stored. For example, a first standardized display may be used for all insurance credentials and a second standardized display may be used for all loyalty credentials. A credential title field 602 may display the name of the displayed credential. The credential name may be set by the issuing agency, by the user, or by the OVER File generation and verification engine 8. As shown in FIG. 9, the credential display 600 may comprise three text sections, text section A 606, text section B 608, and text section C 610. Each text section may be configured to display textual information based on the type of credential selected for presentation. For example, a user may select a driver's license as the displayed OVER File credential. Text section A 606 may be configured to display the user's name as it appears on the user's driver license. Text section B 608 may be configured to display the user's home address and birth date. Text section C 610 may be configured to display a driver's license identification number. Those skilled in the art will recognize that any suitable textual information may be displayed in any of the available text sections 606, 608, 610. In some embodiments, one or more of the text sections 606, 608, 610 may be configured to display the same information regardless of the type of credential displayed. For example, text section C 610 may be configured to always display a credential identification number associated with the credential by the issuing agency. In some embodiments, an image field 604 may be included in the credential display 600.

The image field 604 may be configured to display an image selected by the issuing agency, such as, for example, an image of a physical credential which forms the basis of the OVER File credential such as a driver's license, a logo of the issuing agency such as a corporate logo for a loyalty card, or any other image selected by the issuing agency. The image field 604 may display the selected image as a further validity check for the displayed OVER File credential.

Figure 8:
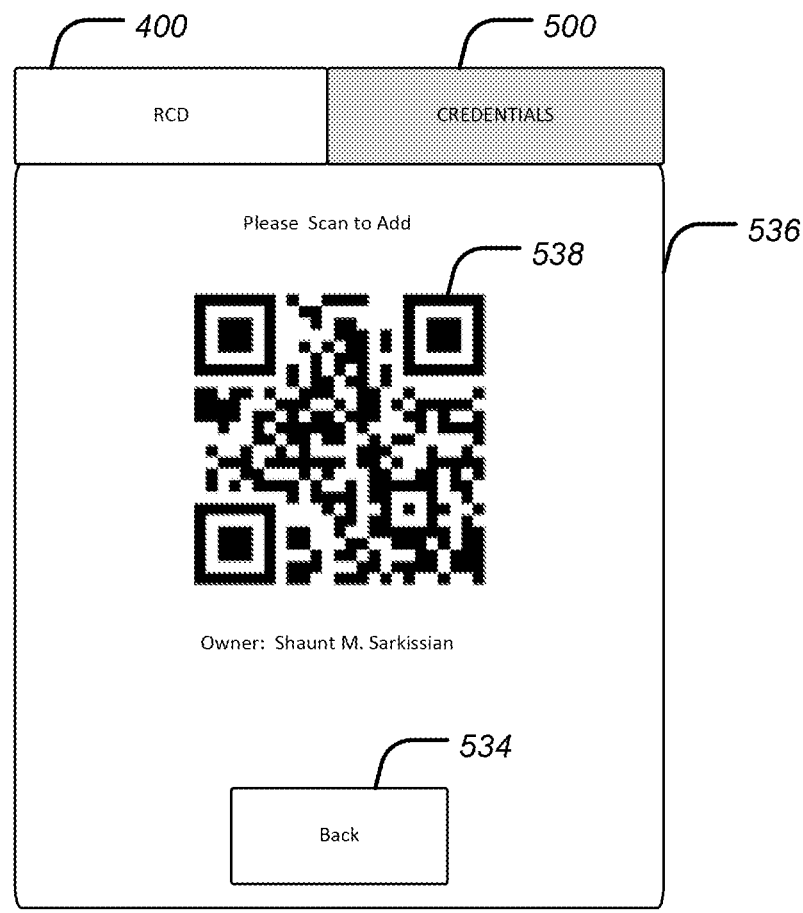
FIG. 8 illustrates one embodiment of a displayed OVER File credential oriented vertically.

An information code section 612 may be included in some embodiments of the credential display 600. As discussed above, an information code may be displayed by the OVER File storage client 500 for third-party verification of stored OVER File credentials. An information code, such as the information code 538 shown in FIG. 8, may be displayed with the selected OVER File credential in the information code section 612. By displaying the information code with other available credential information, the OVER File platform may facilitate easier verification, such as allowing a merchant to quickly establish whether an age restriction has been met prior to scanning the displayed information code. In addition, a third-party may ensure that the credential information received from the OVER File generation and verification engine 8 matches the OVER File credential displayed on the user device.

In some embodiments, one or more functions of the user device may be disabled when an OVER File credential is displayed on the user device. For example, a user device may be capable of taking a screenshot of the content displayed on the device screen. In order to prevent duplication of an OVER File credential outside of the OVER File management platform 2, the OVER File storage client 500 may disable the screenshot capability of the user device during the time that the OVER File credential is displayed on the user device. In some embodiments, all functions, with the exception of the display function, may be disabled for a predetermined period of time while the OVER File credential is displayed on the screen. For example, the OVER File credential may be displayed for a predetermined time period, such as 20 seconds, during which time all functions of the user device may be disabled. After the predetermined time period, the credential display 600 may revert to a previously displayed screen, such as the home screen 502, at which point the functions of the user device may be re-enabled.

Figure 10:
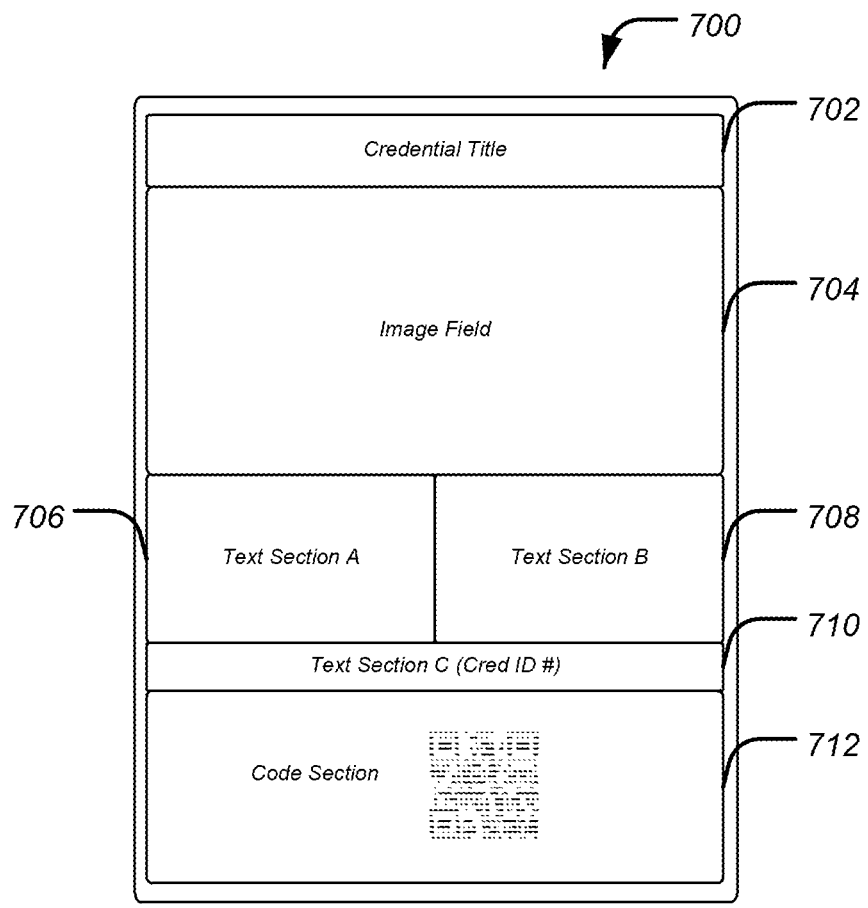
FIG. 10 illustrates one embodiment of a information code for generation or verification of an OVER File.

FIG. 10 illustrates another embodiment of a credential display 700. The credential display 700 is similar to the credential display 600 shown in FIG. 9. The credential display 700 comprises the same fields as the credential display 600, such as the credential title 702, the image field 704, text section A 706, text section B 708, text section C 710, and information code section 712. The credential display 700 is oriented horizontally. In some embodiments, the OVER File storage client 500 may switch between the credential display 600 and the credential display 700 depending on the orientation of the user device. For example, a user may hold a user device such that the user device is horizontally oriented. The credential display 600 may be displayed to match the orientation of the user device. If a user rotates the user device such that the user device is vertically oriented, the OVER File storage client 500 may display the credential display 700 to match the new orientation of the user device.

Figure 11:
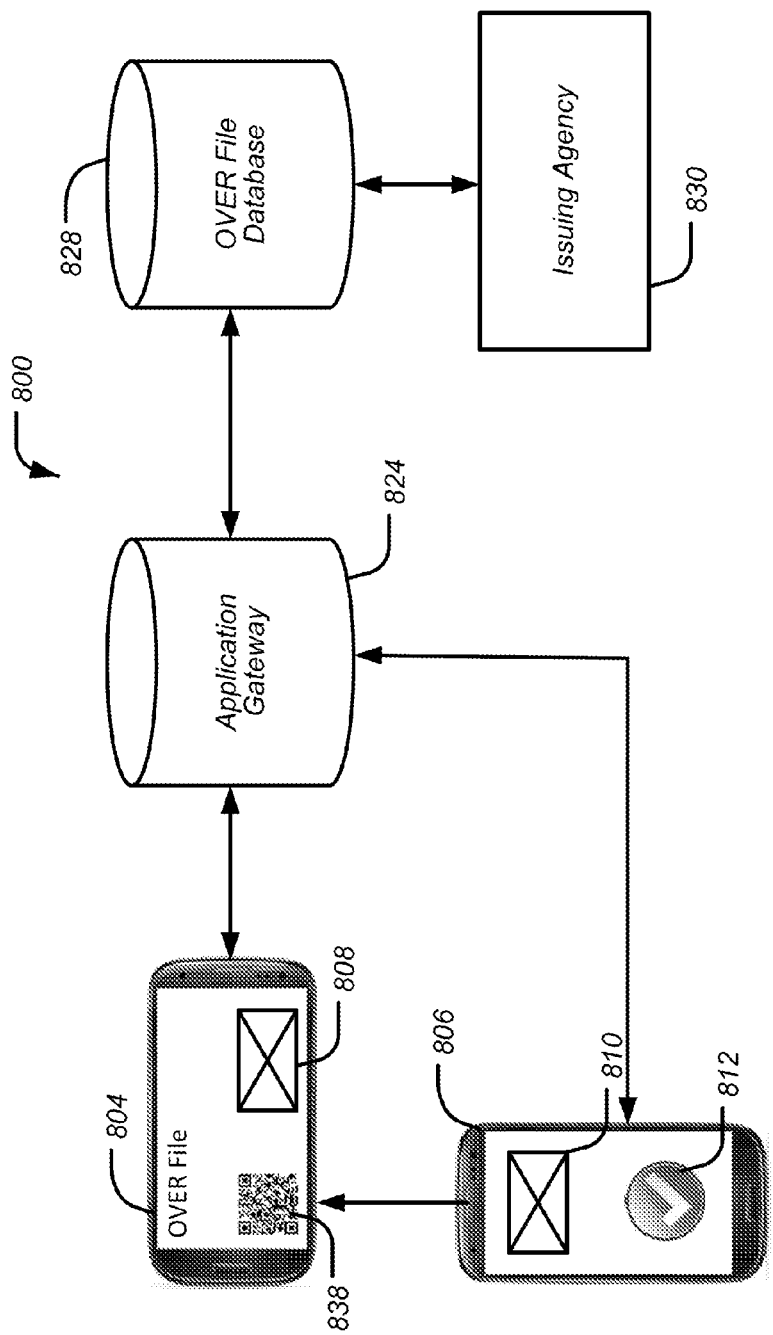
FIG. 11 illustrates one embodiment of a credential presentation and verification process.

FIG. 11 illustrates one embodiment of a credential presentation and verification process 800. As discussed above, a user may display a selected credential on a user device 804 using the OVER File storage client 4. The displayed user credential may comprise a information code 838 and an image field 808. The image field 808 may display an image provided by the issuing agency, such as, for example, an image of a physical credential, an image of a user, or a logo of the issuing agency. The information code 806 may comprise a scannable code such as, for example, a barcode or a QR code, comprising a credential identifier. A third-party may use a third-party device 806 comprising the OVER File third party client 6 to scan the displayed information code 806. The third-party device 806 may contact the application gateway 824 to request verification of the OVER File credential identified by the credential identifier contained in the scanned information code 838. The application gateway 824 may contact the OVER File database 828 to verify the existence and validity of the requested OVER File. The OVER File database 828 may comprise the OVER File generation and verification engine 8. The OVER File database 828 may be in contact with an issuing agency database 830 to periodically update the validity and status of the OVER Files stored in the OVER File database 828. The application gateway 824 may provide a status indicator to the third-party device 804 indicating the validity of the requested credential. In one embodiment, if the status indicator indicates a valid credential, a response to the third party device 804 may comprise an image displayed in the image field 810 on the third party device 806. The displayed image may be the same image as displayed in the image field 808 of the user device 802. The third-party device may display the status indicator 812. A valid status indicator may be displayed as, for example, a checkmark indicating that the requested credential exists and is valid. In some embodiments, if the status indicator indicates an invalid credential, a response to the third party device may comprise a reason for the invalid response. The reason for the invalid response may be displayed in the image field 810. The status indicator 812 may display as, for example, an X indicating that the requested credential is invalid.

Figure 12:
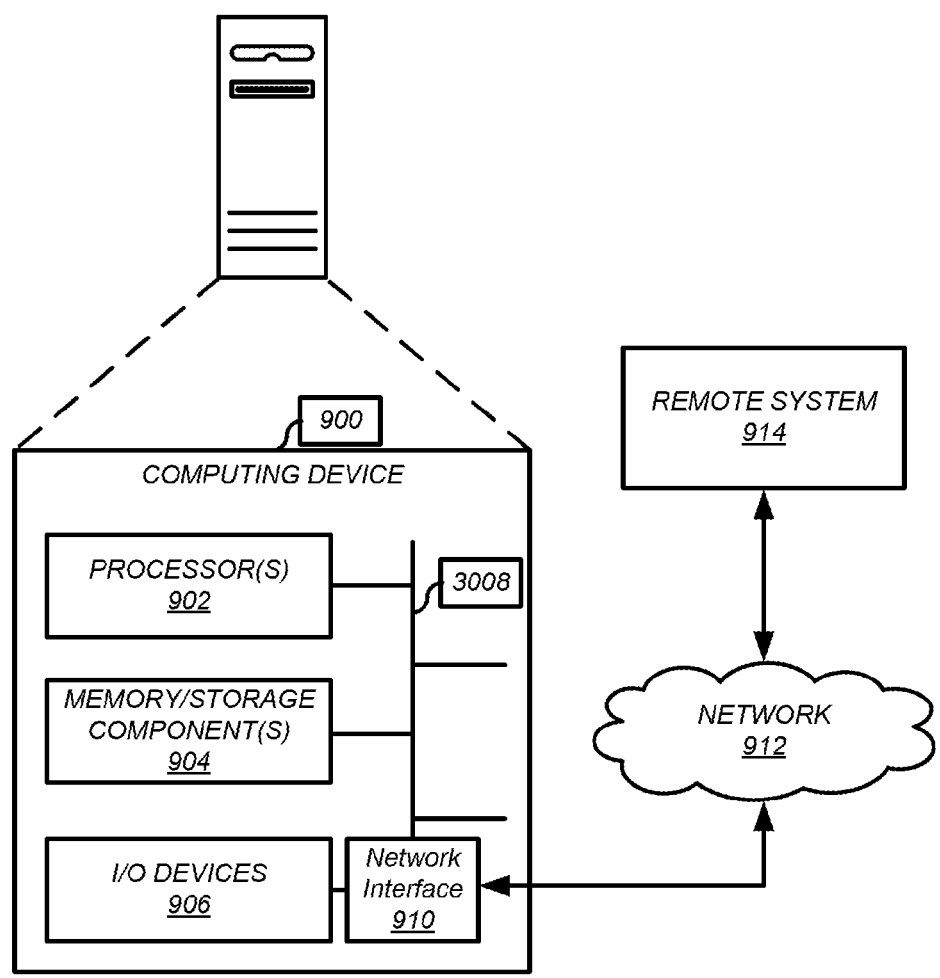
FIG. 12 illustrates one embodiment of a computing environment for implementing an OVER File management platform.

FIG. 12 illustrates one embodiment of a computing device 900 which can be used in one embodiment of the system and method for generating, storing, and displaying OVER Files and associated credentials. For the sake of clarity, the computing device 900 is shown and described here in the context of a single computing device. It is to be appreciated and understood, however, that any number of suitably configured computing devices can be used to implement any of the described embodiments. For example, in at least some implementation, multiple communicatively linked computing devices are used. One or more of these devices can be communicatively linked in any suitable way such as via one or more networks (LANs), one or more wide area networks (WANs) or any combination thereof.

In this example, the computing device 900 comprises one or more processor circuits or processing units 902, on or more memory circuits and/or storage circuit component(s) 904 and one or more input/output (I/O) circuit devices 906. Additionally, the computing device 900 comprises a bus 908 that allows the various circuit components and devices to communicate with one another. The bus 908 represents one or more of any of several types of bus structures, including a memory bus or local bus using any of a variety of bus architectures. The bus 908 may comprise wired and/or wireless buses.

The processing unit 902 may be responsible for executing various software programs such as system programs, applications programs, and/or module to provide computing and processing operations for the computing device 900. The processing unit 902 may be responsible for performing various voice and data communications operations for the computing device 900 such as transmitting and receiving voice and data information over one or more wired or wireless communication channels. Although the processing unit 902 of the computing device 900 includes single processor architecture as shown, it may be appreciated that the computing device 900 may use any suitable processor architecture and/or any suitable number of processors in accordance with the described embodiments. In one embodiment, the processing unit 900 may be implemented using a single integrated processor.

The processing unit 902 may be implemented as a host central processing unit (CPU) using any suitable processor circuit or logic device (circuit), such as a as a general-purpose processor. The processing unit 902 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 902 may be coupled to the memory and/or storage component(s) 904 through the bus 908. The memory bus 908 may comprise any suitable interface and/or bus architecture for allowing the processing unit 902 to access the memory and/or storage component(s) 904. Although the memory and/or storage component(s) 904 may be shown as being separate from the processing unit 902 for purposes of illustration, it is worthy to note that in various embodiments some portion or the entire memory and/or storage component(s) 904 may be included on the same integrated circuit as the processing unit 902. Alternatively, some portion or the entire memory and/or storage component(s) 904 may be disposed on an integrated circuit or other medium (e.g., hard disk drive) external to the integrated circuit of the processing unit 902. In various embodiments, the computing device 900 may comprise an expansion slot to support a multimedia and/or memory card, for example.

The memory and/or storage component(s) 904 represent one or more computer-readable media. The memory and/or storage component(s) 904 may be implemented using any computer-readable media capable of storing data such as volatile or non-volatile memory, removable or non-removable memory, erasable or non-erasable memory, writeable or re-writeable memory, and so forth. The memory and/or storage component(s) 904 may comprise volatile media (e.g., random access memory (RAM)) and/or nonvolatile media (e.g., read only memory (ROM), Flash memory, optical disks, magnetic disks and the like). The memory and/or storage component(s) 904 may comprise fixed media (e.g., RAM, ROM, a fixed hard drive, etc.) as well as removable media (e.g., a Flash memory drive, a removable hard drive, an optical disk, etc.). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 906 allow a user to enter commands and information to the computing device 900, and also allow information to be presented to the user and/or other components or devices. Examples of input devices include a keyboard, a cursor control device (e.g., a mouse), a microphone, a scanner, biometric sensors, and the like. Examples of output devices include a display device (e.g., a monitor or projector, speakers, a printer, a network card, etc.). The computing device 900 may comprise an alphanumeric keypad coupled to the processing unit 902. The keypad may comprise, for example, a QWERTY key layout and an integrated number dial pad. The computing device 900 may comprise a display coupled to the processing unit 902. The display may comprise any suitable visual interface for displaying content to a user of the computing device 4000. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 902 may be arranged to provide processing or computing resources to the computing device 900. For example, the processing unit 902 may be responsible for executing various software programs including system programs such as operating system (OS) and application programs. System programs generally may assist in the running of the computing device 900 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, Android OS, Apple OS or other suitable OS in accordance with the described embodiments. The computing device 900 may comprise other system programs such as device drivers, programming tools, utility programs, software libraries, application programming interfaces (APIs), and so forth.

The computer 900 also includes a network interface 910 coupled to the bus 908. The network interface 910 provides a two-way data communication coupling to a local network 912. For example, the network interface 910 may be a digital subscriber line (DSL) modem, satellite dish, an integrated services digital network (ISDN) card or other data communication connection to a corresponding type of telephone line. As another example, the communication interface 910 may be a local area network (LAN) card effecting a data communication connection to a compatible LAN. Wireless communication means such as internal or external wireless modems may also be implemented.

In any such implementation, the network interface 910 sends and receives electrical, electromagnetic or optical signals that carry digital data streams representing various types of information, such as the selection of goods to be purchased, the information for payment of the purchase, or the address for delivery of the goods. The network interface 910 typically provides data communication through one or more networks to other data devices. For example, the network interface 910 may effect a connection through the local network to an Internet Host Provider (ISP) or to data equipment operated by an ISP. The ISP in turn provides data communication services through the internet (or other packet-based wide area network). The local network and the internet both use electrical, electromagnetic or optical signals that carry digital data streams. The signals through the various networks and the signals on the network interface 910, which carry the digital data to and from the computer system 400, are exemplary forms of carrier waves transporting the information.

The computer 900 can send messages and receive data, including program code, through the network(s) and the network interface 910. In the Internet example, a server might transmit a requested code for an application program through the internet, the ISP, the local network (the network 912) and the network interface 910. In accordance with the invention, one such downloaded application provides for the identification and analysis of a prospect pool and analysis of marketing metrics. The received code may be executed by processor 904 as it is received, and/or stored in storage device 910, or other non-volatile storage for later execution. In this manner, computer 900 may obtain application code in the form of a carrier wave.

In various embodiments, a computer-implemented method for generating and verifying officially verifiable electronic representations may be disclosed. The method may comprise receiving, by a credential database, a request for a credential action. The credential database may be configured to store one or more credentials comprising a status indicator. The method may further comprise determining, by the credential database, a response to the credential action based on the one or more user credentials stored in the credential database and transmitting, by the credential database, the response to a client device. The credential action may comprise generating a credential. The credential may be generated when the credential database determines that no matching credential is stored in the credential database.

In some embodiments, generation of a credential may comprise requesting, by the credential database, the credential from an issuing agency database. The issuing agency database may be configured to store credentials issued by an issuing agency. The method may further comprise receiving, by the credential database, the status indicator and credential information associated with the credential transmitted by the issuing agency database and storing the credential and the status indicator in the credential database. The credential information may comprise the credential, and wherein the status indicator indicates a valid credential. The response transmitted to the user device may comprise the credential and a copy of the credential may be stored in the credential database. The credential database may generate a device identifier for the credential. The device identifier may limit the credential to the client device. The status indicator may indicate an invalid credential. When the status indicator indicates an invalid credential, the response transmitted to the user device may comprise the status indicator. In some embodiments, the validity of the credential may additionally depend upon other information submitted by the client, such as, for example, biometric, location, password, device identifiers, and/or other user-specific information.

The credential action may comprise checking a status indicator of a stored credential. The request for the credential action may comprise a credential identifier. The credential response may be determined by comparing the credential identifier with the one or more credentials stored in the credential database. When the credential identifier matches a stored credential, the response to the request for the credential action may comprises the status indicator of the stored credential and may further comprise a portion of the stored credential. When the credential identifier does not match a stored credential, the response to the request for the credential action comprises an invalid credential response.

In various embodiments, a computer-implemented method for requesting an officially verifiable electronic representation is disclosed. The method may comprise generating, a processor, a request for a credential action. The request may comprise a credential identifier. The method may further comprise transmitting, by the processor, the request for the credential action to a credential database and receiving, by the processor, a response to the request for the credential action. The request for credential action may comprise a credential generation.

In some embodiments a scanner may scan an information code comprising the credential identifier. The response to the request for the credential action may comprise a generated credential. The generated credential may comprise the credential identifier and additional credential information. The additional credential information may be obtained, for example, from the issuing agency database. The generated credential may comprise a device identifier. The device identifier may limit the generated credential to the processor. The request for the credential action may comprise a credential verification request. The response to the request for the credential action may comprise a status indicator. When the status indicator indicates a valid credential, the response to the request for the credential action may comprise a credential image. When the status indicator indicates an invalid credential, the response to the request for the credential action may comprise an invalidity response identifying a reason for the invalid credential.

In various embodiments, an apparatus for generating and verifying officially verifiable electronic representations is disclosed. The apparatus may comprise a processor and a memory unit operatively coupled to the processor. The memory unit may be configured to store a plurality of instructions, wherein the instructions are configured to program the processor. The processor may be programmed to maintain a credential database. The credential database may be configured to store one or more credentials comprising a status indicator. The credential database may be configured to store pointers to other data stores and/or services accessible via a network. The processor may further receive a request for a credential action and determine a response to the credential action based on the one or more user credentials stored in the credential database. The processor may be programmed to transmit the response to a client device.

In some embodiments, generation of a credential may comprise generating a request for the credential from an issuing agency database. The issuing agency database may be configured to store credentials issued by an issuing agency. The processor may receive the status indicator and credential information associated with the credential transmitted by the issuing agency database and may store the credential and the status indicator in the memory unit. The credential information may comprise the credential when the status indicator indicates a valid credential. The response transmitted to the user device may comprise the credential and a copy of the credential may be stored in the memory unit. The processor may generate a device identifier for the credential. The device identifier may limit the credential to the client device. The status indicator may indicate an invalid credential. When the status indicator indicates an invalid credential, the response transmitted to the user device may comprise the status indicator.

The credential action may comprise checking a status indicator of a stored credential. The request for the credential action may comprise a credential identifier. The credential response may be determined by comparing the credential identifier with the one or more credentials stored in the memory unit. In some embodiments, the response may additionally be determined by comparing other information submitted by the client, such as, for example, location, biometric information, and/or device identifiers, with stored credentials. When the credential identifier matches a stored credential, the response to the request for the credential action may comprise the status indicator of the stored credential and may further comprise a portion of the stored credential. When the credential identifier does not match a stored credential, the response to the request for the credential action comprises an invalid credential response.

Various embodiments may be described herein in the general context of computer executable instructions, such as software, program modules, and/or engines being executed by a computer. Generally, software, program modules, and/or engines include any software element arranged to perform particular operations or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, program modules, and/or engines may be located in both local and remote computer storage media including memory storage devices.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a general purpose processor or application specific processor. The embodiments, however, are not limited in this context.

The functions of the various functional elements, logical blocks, modules, and circuits elements described in connection with the embodiments disclosed herein may be implemented in the general context of computer executable instructions, such as software, control modules, logic, and/or logic modules executed by the processing unit. Generally, software, control modules, logic, and/or logic modules comprise any software element arranged to perform particular operations. Software, control modules, logic, and/or logic modules can comprise routines, programs, objects, components, data structures and the like that perform particular tasks or implement particular abstract data types. An implementation of the software, control modules, logic, and/or logic modules and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, control modules, logic, and/or logic modules may be located in both local and remote computer storage media including memory storage devices.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

It is worthy to note that any reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

What is claimed is:

1. A computer-implemented method comprising:
storing, in a memory of an officially verifiable electronic representation (OVER) generation and verification engine, information associated with a credential of a user for proving the user's identity or qualifications;
receiving, from an OVER file storage client device of the user, an OVER file generation request to provide authentication of the user based on the information associated with the credential;
generating, by a processor of the OVER engine, an OVER file comprising a virtual representation of the credential that has been verified by an issuing agency to be an official representation of the credential, based on the information associated with the credential of the user;
transmitting, to the OVER file storage client device of the user, the OVER file in response to the OVER file generation request;
receiving, from an OVER file third-party client verifying device, a verifying request to verify that the OVER file transmitted to the user authenticates the user based on a scan associated with the OVER file on the OVER file store client device of the user;
verifying that the scan associated with the OVER file corresponds with the information associated with the credential of the user that is stored in the OVER engine, in response to the verifying request; and
transmitting, to the OVER file third-party client verifying device, an authentication message comprising an indication of whether the scan associated with the OVER file on the device of the user corresponds to the information associated with the credential of the user that is stored in the OVER engine.

2. The computer-implemented method of claim 1, wherein the OVER file is a first OVER file, the OVER file storage client device of the user is a first OVER file storage client device of the user, the virtual representation is a first virtual representation, the official representation is a first official representation, and the method further comprises:
receiving, from a second OVER file storage client device of the user, a second OVER file generation request to provide authentication of the user based on the information associated with the credential;
generating, by the processor, a second OVER file comprising a second virtual representation of the credential that has been verified by the issuing agency to be a second official representation of the credential that is invalid for use in the first OVER file storage client device for authenticating the user; and
transmitting to the second OVER file storage client device of the user the second OVER file in response to the second OVER file generation request.

3. The computer-implemented method of claim 1, further comprising generating, by the processor of the OVER engine, the credential, wherein the credential is generated when the processor determines that no credential of the user is stored.

4. The computer-implemented method of claim 1, further comprising:
requesting, by the processor of the OVER engine to the issuing agency, an agency authentication to validate the credential, wherein the issuing agency issued the credential of the user;
receiving, by the OVER engine, a status indicator and credential information associated with the credential; and
storing, by the OVER engine, the status indicator.

5. The computer-implemented method of claim 4, wherein the status indicator indicates the credential is valid.

6. The computer-implemented method of claim 1, further comprising generating, by the OVER engine, a device identifier for the credential, wherein the device identifier limits the credential to the OVER file storage client device.

7. The computer-implemented method of claim 4, wherein the status indicator indicates an invalid credential and the credential information indicates a reason for the invalid credential.

8. The computer-implemented method of claim 1, further comprising generating, by the OVER engine, a reference to a remotely stored credential, wherein the information associated with the credential of the user comprises the reference to the remotely stored credential.

9. The computer-implemented method of claim 1, further comprising storing, by the OVER engine, user-specific information.

10. The computer-implemented method of claim 9, wherein the user specific-information comprises at least one of:
biometric information, location information, a password, or a device identifier.

11. The computer-implemented method of claim 1, further comprising checking, by the OVER engine, a status indicator of a stored credential, wherein the OVER file generation request comprises a credential identifier for specifying which credential among a plurality of credentials of the user is officially represented by the OVER file.

12. The computer-implemented method of claim 11, wherein verifying that the scan of the OVER file corresponds with the credential of the user comprises comparing the credential identifier with one or more stored credentials.

13. The computer-implemented method of claim 12, wherein the authentication message comprises the status indicator of the stored credential when the credential identifier matches a stored credential.

14. The computer-implemented method of claim 1, wherein the OVER file comprises a portion of the stored credential.

15. A computer-implemented method comprising:
transmitting, from an officially verifiable electronic represent (OVER) file storage client device of a user to an OVER file generation and verification engine, an OVER file generation request to provide authentication of the user based on information associated with a credential of the user, the credential proving the user's identity or qualifications;
receiving, at the OVER file storage client device of the user, an OVER file in response to the OVER file generation request, the OVER file comprising a virtual representation of the credential that has been verified by an issuing agency to be an official representation of the credential, based on the information associated with the credential of the user;

displaying a portion of the OVER file to an OVER file third-party client verifying device to authenticate the user; and receiving, at the OVER file storage client device of the user, an authentication message comprising a status indicator indicating whether the OVER file corresponds to the credential of the user.

16. The computer-implemented method of claim 15, wherein the displayed portion of the OVER file is scanned as part of authenticating the user.

17. The computer-implemented method of claim 15, wherein the OVER file comprises a device identifier, wherein the device identifier limits the validity of the OVER file to the device of the user.

18. The computer-implemented method of claim 15, further comprising:
    collecting, by the device, user-specific information; and
    transmitting, by the device, the user-specific information to a credential engine, wherein the user-specific information is included in the OVER file.

19. The computer-implemented method of claim 15, wherein when the OVER file comprises a credential image.

20. The computer-implemented method of claim 15, wherein when the status indicator indicates an invalid credential, and the authentication message comprises a reason for the invalid credential.

21. An apparatus comprising:
    a processor;
    a memory unit operatively coupled to the processor, the memory unit configured to store information associated with a credential of a user and a plurality of instructions, wherein the instructions are configured to program the processor to:
    receive, from an officially verifiable electronic representation (OVER) file storage client device of the user, an OVER file generation request to provide authentication of the user based on the information associated with the credential;
    generate an OVER file comprising a virtual representation of the credential that has been verified by an issuing agency to be an official representation the credential, based on the information associated with the credential of the user;
    transmit, to the OVER file storage client device of the user, the OVER file in response to the first OVER file generation request;
    receive, from an OVER file third-party client verifying device, a verifying request to verify that the OVER file transmitted to the device of the user authenticates the user based on a scan associated with the OVER file on the device of the user;
    verify that the scan associated with the OVER file corresponds with the information associated with the credential of the user, in response to the verifying request; and
    transmit, to the OVER file third-party client verifying device, an authentication message comprising a status indicator indicating whether the OVER file corresponds to the credential of the user.

22. The apparatus of claim 21, wherein the instructions further program the processor to generate the credential, wherein the credential is generated when the processor determines that no matching credential is stored.

23. The apparatus of claim 21, wherein the instructions are further configured to program the processor to:
    request the credential from the issuing agency, wherein the issuing agency stores credentials issued by the issuing agency;
    receive the status indicator and credential information associated with the credential transmitted by the issuing agency; and
    store the credential and the status indicator.

24. The apparatus of claim 23, wherein the credential information comprises the credential, and wherein the status indicator indicates a valid credential.

25. The apparatus of claim 23, wherein the credential information comprises user-specific information.

26. The apparatus of claim 25, wherein the user-specific information is selected from the group consisting of: biometric information, location information, a password, a device identifier.

27. The apparatus of claim 21, wherein the instructions are further configured to program the processor to generate a device identifier for the credential, wherein the device identifier limits the credential to the client device.

28. The apparatus of claim 23, wherein the status indicator indicates an invalid credential, and wherein the response transmitted to the user device comprises the status indicator.

29. The apparatus of claim 23, wherein the stored credential comprises a reference to a remotely stored credential.

30. The apparatus of claim 23, wherein the instructions further program the processor to check a stored status indicator of the stored credential, wherein the status indicator comprises the stored status indicator.

31. The apparatus of claim 30, wherein the authentication message is determined by comparing a credential identifier associated with the credential of the user with the one or more stored credentials.

32. The apparatus of claim 31, wherein when the credential identifier matches the stored credential, and the authentication message comprises the status indicator of the stored credential.

33. The apparatus of claim 32, wherein when the credential identifier does not match a stored credential, and the authentication message comprises an invalid credential response.

* * * * *